United States Patent [19]

Rundle

[11] Patent Number: 4,713,983
[45] Date of Patent: Dec. 22, 1987

[54] WIDE RANGE TRANSMISSION

[76] Inventor: Kenneth P. Rundle, 8304 Brookside Rd., Independence, Ohio 44131

[21] Appl. No.: 3,452

[22] Filed: Jan. 14, 1987

Related U.S. Application Data

[63] Continuation-in-part of Ser. No. 727,834, Apr. 26, 1985, abandoned.

[51] Int. Cl.[4] .................... F16H 37/08; F16H 3/08
[52] U.S. Cl. ............................... 74/701; 74/363; 74/371; 74/372; 74/375
[58] Field of Search ............... 74/701, 363, 371, 372, 74/375

[56] References Cited

U.S. PATENT DOCUMENTS

| | | | |
|---|---|---|---|
| 2,763,350 | 9/1956 | Klaue | 74/701 X |
| 2,937,539 | 5/1960 | Mueller | 74/363 X |
| 3,040,601 | 6/1962 | Lewis | 74/740 |
| 3,065,643 | 11/1962 | Mark et al. | 74/740 X |
| 3,812,735 | 5/1974 | Von Kaler et al. | 74/371 |
| 3,889,547 | 6/1975 | Sun et al. | 74/372 X |
| 3,890,850 | 6/1975 | Hauser et al. | 74/372 |
| 4,103,566 | 8/1978 | Von Kaler et al. | 74/701 |
| 4,212,210 | 7/1980 | Von Kaler et al. | 74/375 |
| 4,232,569 | 11/1980 | Hauser et al. | 74/701 |
| 4,299,134 | 11/1981 | Roy et al. | 74/701 X |
| 4,449,424 | 5/1984 | Hauser | 74/701 |
| 4,480,501 | 11/1984 | Von Kaler | 74/701 X |
| 4,611,504 | 9/1986 | Rundle | 74/713 X |
| 4,662,241 | 5/1987 | Edwards | 74/705 X |

Primary Examiner—Leslie Braun
Assistant Examiner—James Innskeep

[57] ABSTRACT

A transmission, especially for use with small tractors and the like, provides a number of higher speed drives, typically associated with mowing, and a number of extremely slow "creep" speed drives to make said tractor more compatible with snow blower and tiller implements. All speed drives are available in a single range with each being selected sequentially by movement of a single gearshift lever. A unique reduction train exploits one or more higher speed drives to drive the "creep" speed pinions and a safer reverse speed drive at reduced rotational speed. The extremely wide speed ratio range will also dismiss the smallest pinions and severe speed increasing drives presently employed in these transmissions to greatly increase capacity and to reduce costs.

6 Claims, 4 Drawing Figures

WIDE RANGE TRANSMISSION

This application is a continuation-in-part of the copending U.S. patent application Ser. No. 727,834 filed Apr. 26, 1985, entitled "Wide Range Transaxle" and now abandoned. The present invention relates to a transmission having a unique arrangement of gears to provide a wide range of speeds.

BACKGROUND OF THE INVENTION

A transmission as taught by von Kaler et al, U.S. Pat. No. 3,812,735 includes a sliding key shift means to sequentially engage a number of speed drives between two shafts. This transmission appears in the transaxles by von Kaler et al, U.S. Pat. No. 4,103,566 and by von Kaler, U.S. Pat. No. 4,480,501.

A transaxle, U.S. Pat. No. 4,232,569 issued Nov. 11, 1980, includes a speed transmission and a generally separate range transmission to provide a wide range of speeds engaged by manipulation of two separate gearshift levers.

A transaxle by Rundle, the present Applicant, U.S. Pat. No. 4,611,504, describes a speed transmission and a more integral range transmission to provide a wide range of speeds engaged by manipulation of two separate gearshift levers. The transaxle features a unique coaxial arrangement of shafts shown here in variation of the present invention.

A copending U.S. patent continuation-in-part application Ser. No. 867,939 filed May 29, 1986, by the present Applicant, now U.S. Pat. No. 4,658,662, describes a wide range transmission controlled by a single gearshift lever and having an arrangement different than that of the present invention.

A copending U.S. patent application Ser. No. 873,365 filed June 12, 1986, by the present Applicant describes a new sliding key shift means applicable to the transmission of the present invention.

A manufacturer of small lawn tractors has developed a hybrid tractor to perform many of the tasks previously assigned only to larger and more costly garden tractors. It is imperative to retain the in-line, one lever shift convenience of the popular lawn tractors while providing the extremely slow "creep" speeds necessary for operation with rotary tillers and wide snow throwers. Currently a transaxle is utilized which employs a compromisingly small pinion for the slowest speed drive and a severe "overdrive" speed increasing drive for the fastest speed to provide a ratio range of factor ten. The small pinion must be shaft integral at increased cost and the minimal pitch diameter of the fastest speed driven gear limits the shiftshaft diameter, thus placing extra stress on the shift means. The "overdrive" ratio of the fastest speed drive also requires compensation in the form of increased and costly reduction elsewhere in the tractor drive.

The present invention describes a transmission, in variation, without limitation or compromise for use with these hybrid "super lawn tractors" and with larger garden tractors as well. These new transmissions feature greatly expanded ratio range while employing no compromisingly small pinions. The severe overdrive ratio and associated costs are eliminated so that increased countershaft diameter will strengthen the shift means and allow for coaxial shafting.

SUMMARY OF THE INVENTION

It is an object of the invention to show a single range transmission having a unique "creep" speed train that exploits available space and employs a faster speed pinion to also drive said "creep" speed train.

A further object is to show said transmission as part of a transaxle wherein an axle shaft also serves as a layshaft to said "creep" speed train.

Furthermore, said transmission is shown wherein a faster speed pinion also drives said train while a "creep" speed pinion also serves as a driven gear to said train.

Another object is to show a transmission wherein both a faster speed pinion and gear also serve in said "creep" speed train and wherein the transmission countershaft also serves as layshaft to said train.

An additional object is to show said transmission wherein a reverse speed drive may also benefit from said train.

BRIEF DESCRIPTION OF THE DRAWINGS

The exact nature and advantages of the present invention will become apparent upon reference to the accompanying drawings and following descriptions thereof, in which.

DESCRIPTION OF DRAWING ONE

Figure 1:
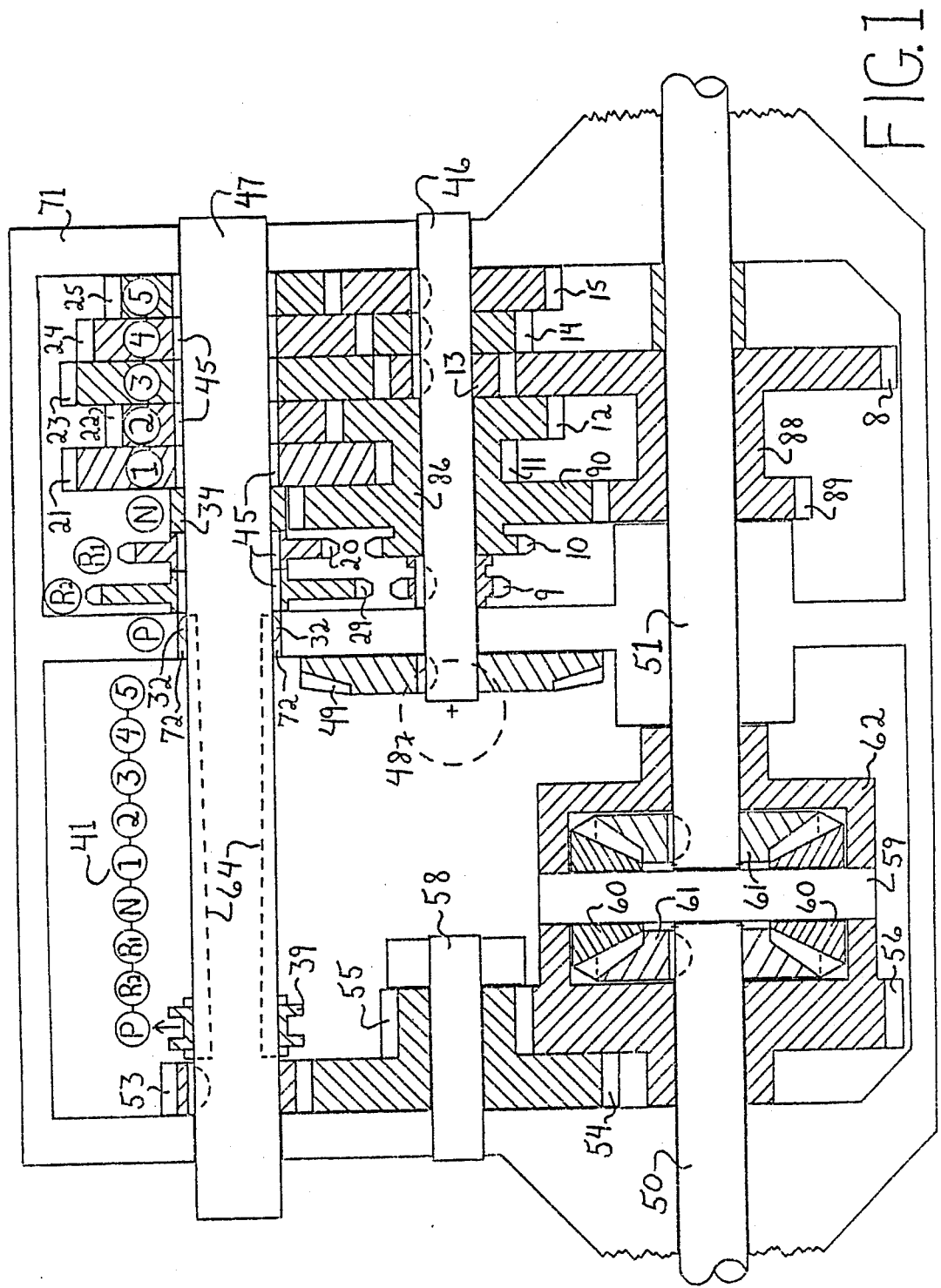
FIGS. 1-4 represent transverse tractor transaxles shown in top view section along a horizontal cutting plane through the center of all shafts shown. A direction to the right of all figures will correspond to the tractor right side. The four lawn and garden transaxles each include a lower case 71 and an upper cover (not shown) joined together with machine bolts (not shown) at a horizontal parting plane that bisects the centers of the main, counter and axle shafts (46, 47, 50, 51 respectively) to provide the entire support and enclosure housing. A vertical input shaft (not shown) journalled in the upper cover enters the housing to end with a bevel pinion (indicated at 48) meshing with bevel gear 49 keyed to mainshaft 46.

Referring to FIG. 1, mainshaft 46, countershaft 47, and axle shafts 50, 51 are journalled parallel in suitable bearings in the housing. Third through fifth speed pinions 13, 14, 15 are keyed to mainshaft 46. First through fifth speed pinions 11-15 mesh with first through fifth speed gears 21-25 each respectively. Third speed pinion 13 also meshes with reduction gear 8 rotatable in cluster 88 with low pinion 89 on axle shaft 51. Low pinion 89 meshes with low gear 90 rotatable in cluster 86 with first and second speed pinions 11, 12 and reverse one driver sprocket 10 on mainshaft 46. The pinions 11, 12 and sprocket 10 are thusly driven at a lesser rate than mainshaft 46 to provide for extremely slow "creep" first, second and reverse one speeds. Sprocket 10 drives reverse one driven sprocket 20 with a roller chain (not shown). Reverse two driver sprocket 9 is keyed to mainshaft 46 and drives reverse two driven sprocket 29 with a second roller chain (not shown).

The five speed gears 21-25 and the two reverse speed sprockets 20, 29 are individually journalled on countershaft 47 and have keyways, as typified at 45, within their respective journal bores to receive drive projections 32 of sliding keys 64. Keys 64 move axially in key grooves of countershaft 47 to engage each speed drive when motivated by axially sliding shift collar 39 connected by suitable linkage to an outside gearshift lever movable in the in-line pattern 41. The countershaft 47 is locked in a "park" state when projections 32 engage keyways 72 of the housing journal wall as shown. A neutral spacer 34 provides for a neutral state and the driven gears 21-25 and sprockets 20, 29 are all separated by washers (not shown) to force the projections 32 completely within the countershaft 47 key grooves between speed drive positions so that no two drives may be partly engaged at one time. The exact nature of the shifting mechanism is fully disclosed in U.S. Pat. No. 3,812,735.

Output pinion 53, keyed to countershaft 47, drives final gear 54 rotatable in cluster with final pinion 55 on layshaft 58 secured in the housing. Pinion 55 meshes with differential input gear 56. The operation of differential 62 is typically automotive and fully described in U.S. Pat. No. 4,103,566. Axle shafts 50 and 51 leave the housing laterally to carry the tractor drive wheels.

As drawn, the transmission employs no pinion having less than fifteen teeth and no speed increasing drives to provide a speed range factor eleven. This FIG. 1 transmission may use a separate layshaft (as 87 FIG. 2) to carry cluster 88. The speed ratio range would then exceed 15.5 while using no pinion having less than twelve teeth. Gears 8 and 89 would then require only twenty six and twelve teeth respectively and countershaft 47 could have even greater diameter to further strengthen a shift means. The gearset 89, 90 occupies the neutral space to minimize transaxle width while preserving the familiar shift sequence 41 having uniform shift intervals.

DESCRIPTION OF DRAWING TWO

Figure 2:
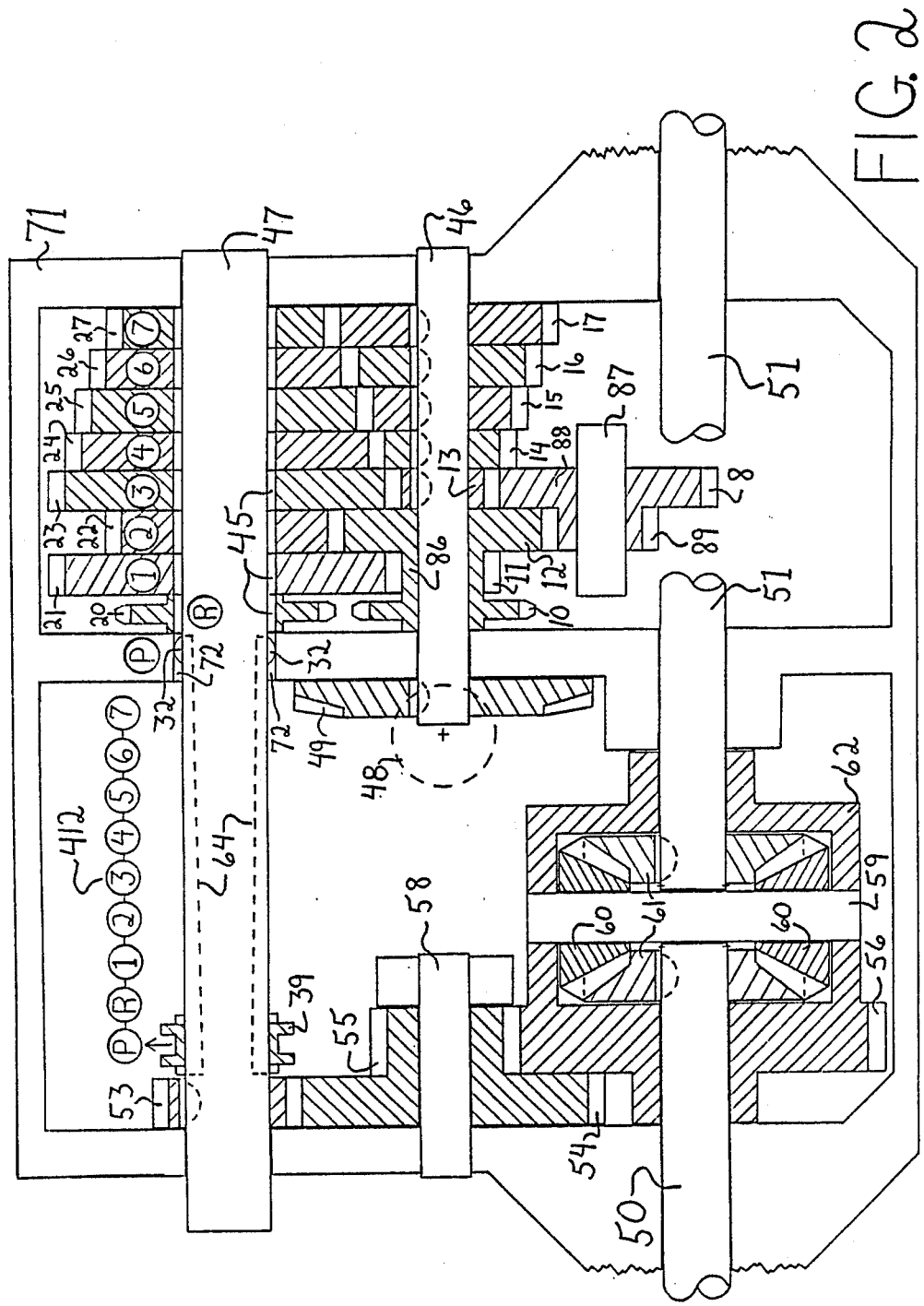

Referring to FIG. 2 primarily, this drawing represents the transaxle of FIG. 1 modified only as follows. The reverse-two speed is eliminated to provide space for a sixth speed drive 16, 26. Cluster 88 is now journalled on a separate layshaft 87 secured in the housing top cover (removed and not shown). Shaft 87 and cluster 88 are drawn here revolved for clarity. Second speed pinion 12 now also serves as the low gear 90 (FIG. 1) to provide space for a seventh speed drive 17, 27. The neutral spacer 34 (FIG. 1) is dismissed with an alternate neutral position available, if desired, by the elimination of the "park" keyways 72 in the housing wall journal.

This FIG. 2 transaxle provides a range of speeds of factor 15.5 on very conservative shaft centers while using no speed increasing drives and no pinion having less than twelve teeth. Travel speeds are provided as follows:

| REVERSE | 1.0 MPH | FOURTH | 3.1 MPH |
| --- | --- | --- | --- |
| FIRST | 0.4 MPH | FIFTH | 4.0 MPH |
| SECOND | 1.5 MPH | SIXTH | 5.1 MPH |
| THIRD | 2.1 MPH | SEVENTH | 7.0 MPH |

An eight speed model would feature a useful 1.0 MPH speed having a speed pinion as part of cluster 86.

DESCRIPTION OF DRAWING THREE
THE PREFERRED EMBODIMENT

Figure 3:
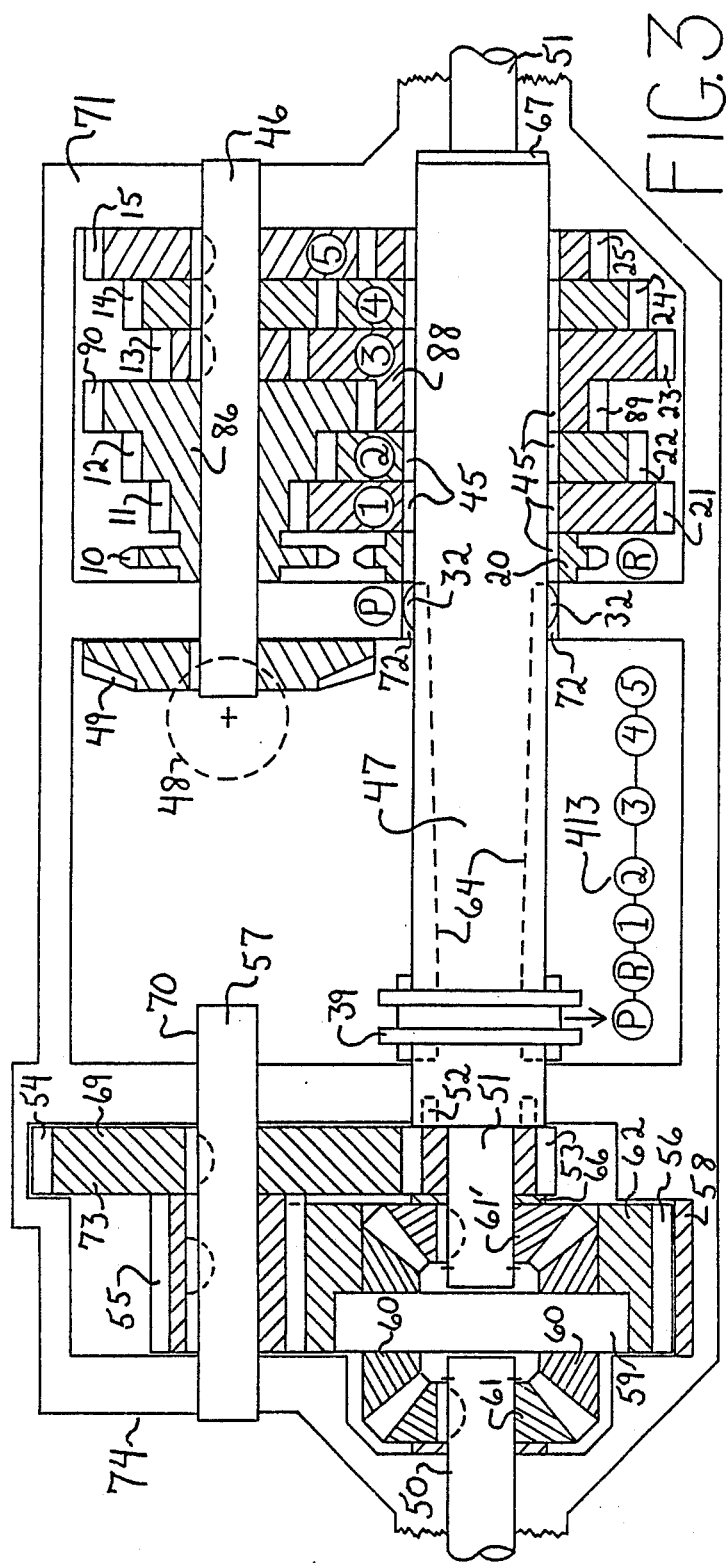

Referring to FIG. 3, mainshaft 46, hollow countershaft 47, reduction shaft 57 and axle shafts 50, 51 are journalled parallel in suitable bearings in the housing with axle shaft 51 passing coaxially through countershaft 47 and being further journalled therein.

Third through fifth speed pinions 13-15 are keyed to mainshaft 46. First through fifth speed pinions 11-15 mesh with first through fifth speed gears 21-25 each respectively. Third speed gear 23 is rotatable in cluster 88 with low pinion 89 on countershaft 47. Low pinion 89 meshes with low gear 90 rotatable in cluster 86 with first and second speed pinions 11, 12 and reverse driver sprocket 10 on mainshaft 46. The pinions 11, 12 and sprocket 10 are thusly driven at a lesser rate than mainshaft 46 to provide for extremely slow "creep" first, second and reverse speeds. Sprocket 10 drives reverse driven sprocket 20 with a roller chain (not shown). The five speed gears 21-25 and the reverse sprocket 20 are individually journalled on countershaft 47 and have keyways as typified at 45 within their respective journal bores to receive drive projections 32 of sliding keys 64 as described with reference to FIG. 1. The keyways 72 in the housing wall journal provide for a safety "park" state or may be omitted in favor of a neutral position.

As drawn, this FIG. 3 transaxle employs a most conservative fourteen percent fifth speed overdrive ratio and no pinion having less than fourteen teeth to provide for travel speeds as follows:

| REVERSE | 1.5 MPH | THIRD | 2.2 MPH |
| --- | --- | --- | --- |
| FIRST | 0.7 MPH | FOURTH | 3.8 MPH |
| SECOND | 1.2 MPH | FIFTH | 7.0 MPH |

To reduce the disproportionate third speed interval of shift sequence 413, the axial width of gearset 89, 90 may be reduced substantially and without compromise as pinion 89 has very considerable pitch diameter and twenty four teeth as drawn. As described with reference to FIG. 1 and to U.S. Pat. No. 3,812,735, the speed gears 21-25 and sprocket 20 are all separated by washers. The washers (not shown) would be arranged so that cluster 88 has one such washer recessed into each side surface to further reduce the third speed shift interval by one washer width.

An output pinion 53 is journalled on axle shaft 51 so that drive dogs 52 engage the shift key grooves of countershaft 47. In this manner constant section countershaft 47 may be finished by broach and pinion 53 may be of sintered metal to reduce costs. Pinion 53 meshes with final gear 54 keyed with final pinion 55 to reduction shaft 57. Pinion 55 meshes with differential input gear 56. Differential 62 is journalled directly in a cavity of the housing aided by a journal slipper 58 as completely described with reference to U.S. Pat. No. 4,480,501. The action of differential 62 is typically automotive with axle shafts 50, 51 leaving the housing laterally to carry the tractor drive wheels. Thrust bearings 66 and 67 transfer axial thrust of bevel gear 61' to the housing.

Gear 54 may serve as a rotor to a "wet" spot brake acting on surface 69. Alternately, a separate brake rotor may be keyed to shaft 57 at 70. The elimination of a brake typically outside at 74 will reduce transaxle width between tractor drive wheels. A miter gear may be incorporated into face 73 of gear 54 to serve as an auxiliary transaxle output for a four wheel drive tractor.

The unique coaxial arrangement of shafts is the subject of U.S. Pat. No. 4,611,504. Afore mentioned U.S. patent application Ser. No. 873,365 describes this FIG. 3 transaxle in combination with a new shift means.

A transaxle (as FIG. 3) having only the first, third and reverse speed drives is very desirable for use in a super lawn tractor featuring variable belt drive as suggested in copending U.S. patent continuation-in-part application Ser. No. 848,228 of the present Applicant. The two forward speed ranges are separated by a large ratio factor so that the low speed range provides true "creep" speeds compatible with a snow blower attachment. The higher speed range overlaps the lower only slightly to provide a full range of typical mowing speeds. The considerable reduction ratio of the higher speed drive (13, 23) affords increased overall transaxle reduction in all three speed ranges to fully exploit the ratio potential of these variable belt drives. The multiplied reduction of the reverse speed drive will safely limit reverse speed while permitting full advance of the variable drive.

DESCRIPTION OF DRAWING FOUR

Figure 4:
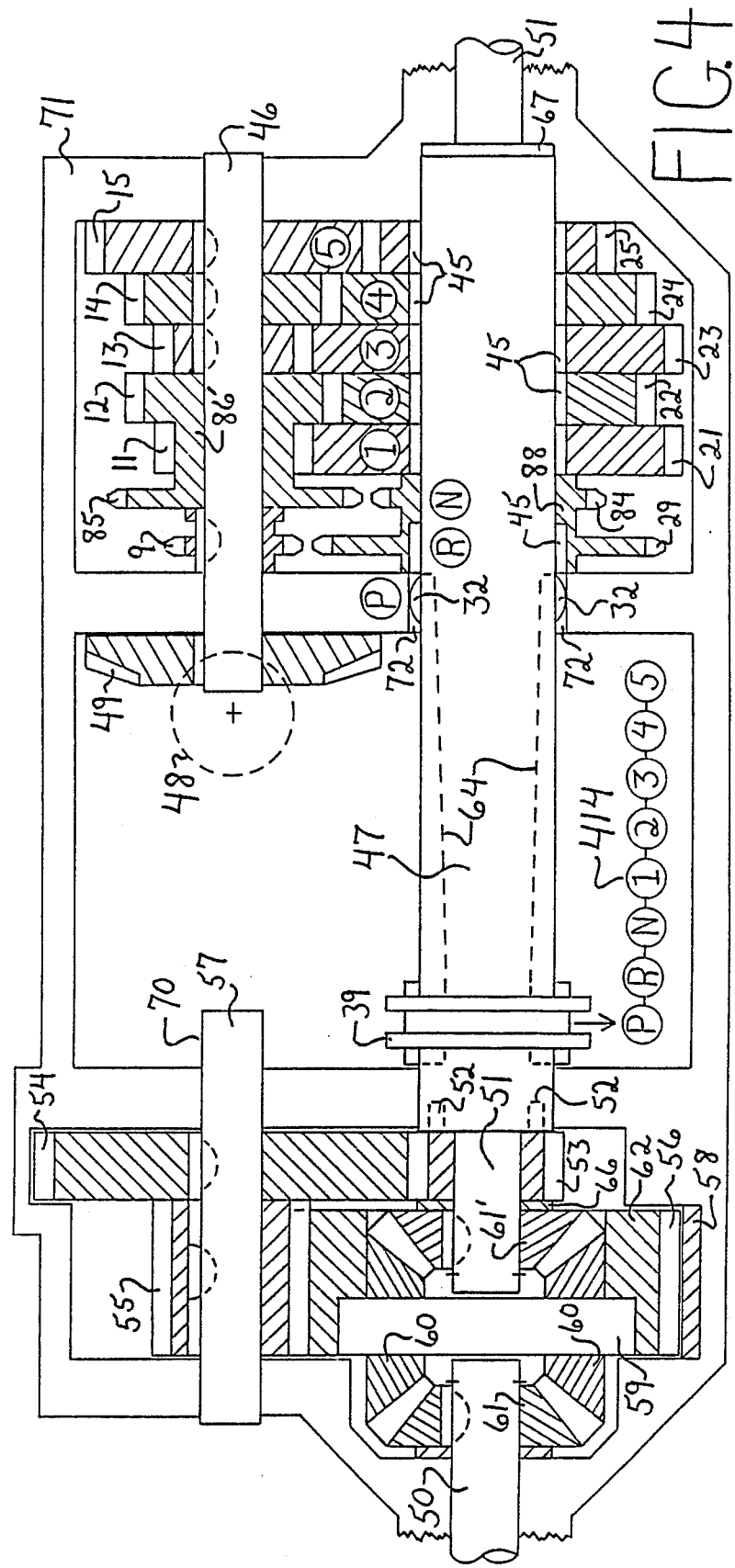

Referring to FIG. 4 primarily, this drawing represents the transaxle of FIG. 3 modified only as follows to provide the more customary and completely proportional gear shift sequence 414. The reverse driver sprocket 9 is removed from cluster 86 and keyed to mainshaft 46. Pinion 89 (FIG. 3) is replaced by a sprocket 84 in cluster 88 with reverse driven sprocket 29. Gear 90 (FIG 3) is replaced by a sprocket 85 in cluster 86' and rotatable on mainshaft 46 with first and second pinions 11, 12. Reverse driver sprocket 9 drives reverse driven sprocket 29 with a roller chain (not shown). Low driver sprocket 84 drives low driven sprocket 85 with a second roller chain (not shown) to drive the first and second speed pinions 11, 12 in proper rotation and at lesser rate than mainshaft 46 to provide for "creep" first and second speeds. The FIG. 4 transaxle provides a range of speeds as those of FIG. 3, however, the reverse speed cannot benefit from the creep reduction train and assumes a speed comparable to that of presently produced transaxles. The two chain drives tend to offset any shaft deflection forces caused by the first and second speed gearsets.

Any nonreversing gear means may replace either chain drive of this FIG. 4 transmission within the scope of the present invention. A separate reverse speed bevel input gear, as 49 on mainshaft 46 opposite gear 49 and also meshing with pinion 48, could be employed to drive a high reduction spur gearset to provide for a slower reverse speed and to replace sprockets 9, 29 and associated chain. The transaxles of FIGS. 3 and 4 are totally equivalent to each other. The two sprocket and chain drives 9, 29 and 84, 85 (FIG. 4) serve the same function as the two gearsets 13, 23, and 89, 90 (FIG. 3). Therefore, the Applicant will refer to either set of drives as "intermeshing gearsets" to recite the invention in a most clear manner.

The many gear clusters shown in the transmissions of FIGS. 1–4 are readily constructed of sintered metal as single pieces, dog interconnected sections or as furnace brazed weldments. In light duty applications, sintered metal might even replace hardened forged steel for the now hollow, large diameter countershaft to further reduce costs.

These new transmissions have been shown to their full advantage to provide the greatest range of ratios consistent with sound design integrity. However, the unique reduction train will also serve to advantage in a transmission requiring a most conservative ratio range of factor five or less. No overly small pinion will be required and no speed increasing drive will restrict countershaft diameter so that capacity and reduction will be higher in all speeds. The fastest speed drive may even have a reduction ratio to further decrease costly reduction elsewhere in a tractor drive. The available reverse speed reduction will address safety concerns.

The new transmissions, which comprise the present invention, provide a manufacturer an uncommon opportunity to produce a superior transmission/transaxle while reducing costs substantially. The large pinions, increased countershaft diameter, wide ratio range and greater overall reduction will serve to eliminate severe overdrive ratios, decrease V-belt reduction, increase capacity, reduce warranty claims, extend the application of these transaxles to larger garden tractors and extend the usefulness of any tractor so equipped. The safer reverse speed and park feature will decrease liability concerns while the extra slow creep speed will enhance performance of these tractors when operating with tiller or snow thrower in severe conditions.

The transmissions comprising the present invention may well find application with a variety of machinery (including trucks) and with any shift means or clutch means shiftable within the scope of the present invention. And while the invention has been disclosed with reference to specific apparatus, these descriptions are only by way of example and not as a limitation to the scope of the invention.

We claim:

1. In a transmission; a housing, an input mainshaft and an output countershaft journalled parallel in said housing, a number of first intermeshing gearsets on said shafts for establishing a number of fast speed drives at respective ratios between said shafts, said fast speed drives having fast speed driver gears nonrotatable on said mainshaft and having respective fast speed driven gears rotatable on said countershaft, and a number of second intermeshing gearsets on said shafts for establishing a number of slow speed drives at respective ratios between said shafts, said slow speed drives having slow speed driver gears all rotatable as one in a first cluster on said mainshaft and having respective slow speed driven gears individually rotatable on said countershaft, and a layshaft supported in said housing parallel to said mainshaft so that said mainshaft is disposed generally between said layshaft and said countershaft, a reduction gear rotatable in a second cluster with a low driver gear on said layshaft, said reduction gear intermeshing with one said fast speed driver gear, said low driver gear intermeshing with a low driven gear rotatable on said mainshaft, said low driven gear being a driving member of said first cluster, clutch means shiftable to drivingly connect said speed driven gears and said countershaft one at a time.

2. The transmission of claim 1 comprised further of; an automotive differential journalled parallel to said mainshaft, two coaxial output axle shafts journalled in said housing coaxially with said differential, differential gear means to drivingly connect said differential and said axle shafts, a gear train to drivingly connect said differential and said countershaft, said axle shafts extending outside said housing to carry tractive elements, wherein one said axle shaft also serves as said layshaft.

3. The transmission of claim 1 further comprised of; a nonreversing drive on said mainshaft and said countershaft for establishing a slow reverse speed drive between said mainshaft and said countershaft, said slow reverse speed drive having a slow reverse speed driver gear rotatable as a driven member of said first cluster on said mainshaft and being in constant drive relationship with a slow reverse speed driven gear rotatable on said countershaft.

4. The transmission of claim 1 further comprised of; a nonreversing drive on said mainshaft and said countershaft for establishing a fast reverse speed drive between said mainshaft and said countershaft, said fast reverse speed drive having a fast reverse speed driver gear nonrotatable on said mainshaft and being in constant drive relationship with a fast reverse speed driven gear rotatable on said countershaft.

5. The transmission of claim 1 wherein one said low speed driver gear also serves as said low driven gear.

6. The transmission of claim 1 wherein said countershaft also serves as said layshaft and wherein one said fast speed driven gear also serves as said reduction gear.

* * * * *